United States Patent
Guillemette et al.

(10) Patent No.: US 10,769,960 B2
(45) Date of Patent: Sep. 8, 2020

(54) METHOD AND SYSTEM FOR SIMULATING A RADAR IMAGE

(71) Applicant: CAE INC., Saint-Laurent (CA)

(72) Inventors: Pascal Guillemette, Saint-Laurent (CA); Taieb Lamine Ben Cheikh, Saint-Laurent (CA)

(73) Assignee: CAE INC., Saint-Laurent (CA)

(*) Notice: Subject to any disclaimer, the term of this patent is extended or adjusted under 35 U.S.C. 154(b) by 67 days.

(21) Appl. No.: 16/350,385

(22) Filed: Mar. 29, 2018

(65) Prior Publication Data

US 2020/0160743 A1    May 21, 2020

Related U.S. Application Data

(60) Provisional application No. 62/590,873, filed on Nov. 27, 2017.

(51) Int. Cl.
| | |
|---|---|
| *G09B 9/40* | (2006.01) |
| *G01S 13/89* | (2006.01) |
| *G01C 11/00* | (2006.01) |

(52) U.S. Cl.
CPC ............. *G09B 9/40* (2013.01); *G01C 11/00* (2013.01); *G01S 13/89* (2013.01)

(58) Field of Classification Search
CPC ............ G09B 9/40; G01C 11/00; G01S 13/89
See application file for complete search history.

(56) References Cited

U.S. PATENT DOCUMENTS

| | | | |
|---|---|---|---|
| 7,750,842 B2* | 7/2010 | Lee | G01S 7/4021 342/169 |
| 8,861,588 B2 | 10/2014 | Nguyen et al. | |
| 9,110,170 B1* | 8/2015 | Woollard | G01C 21/005 |
| 9,188,670 B2 | 11/2015 | Bruyere et al. | |

(Continued)

FOREIGN PATENT DOCUMENTS

WO    2016207669    12/2016

OTHER PUBLICATIONS

"Surface clutter model for real-time simulation of coherent radar modes", Interservice/Industry Training, Simulation, and Education Conference (I/ITSEC), 2013 Paper No. 13082 pp. 1 to 11, Stefano Cavallaro et al.

(Continued)

*Primary Examiner* — Corbett B Coburn
(74) *Attorney, Agent, or Firm* — Fasken Martineau DuMoulin

(57) ABSTRACT

A computer-implemented method for simulating an image of a terrain scanned by a simulated radar beam generated by a simulated radar antenna, comprising: calculating on a first processor a power reflected by the terrain while an orientation of the simulated radar antenna is varied within a scanning antenna range; calculating on a plurality of second processors a convolution power for the terrain while the orientation of the simulated radar antenna is varied within the scanning antenna range, said calculating on a first processor and said calculating on a plurality of second processors being performed concurrently and in parallel; combining the power reflected by the terrain and the convolution power, thereby obtaining combined data; generating a radar image using the combined data; and outputting the radar image.

20 Claims, 12 Drawing Sheets

(56) References Cited

U.S. PATENT DOCUMENTS

| | | | |
|---|---|---|---|
| 9,709,673 B2* | 7/2017 | Carlbom | G01S 13/904 |
| 2004/0105573 A1* | 6/2004 | Neumann | G06T 17/00 |
| | | | 382/103 |
| 2004/0201514 A1* | 10/2004 | Stappaerts | G01S 7/486 |
| | | | 342/25 R |
| 2005/0164147 A1 | 7/2005 | Legan | |
| 2009/0232349 A1* | 9/2009 | Moses | G06F 9/5072 |
| | | | 382/100 |
| 2015/0379766 A1* | 12/2015 | Newman | G01S 17/87 |
| | | | 356/5.01 |
| 2019/0164445 A1* | 5/2019 | Guillemette | G09B 9/54 |

OTHER PUBLICATIONS

"Accelerating Spaceborne SAR Imaging Using Multiple CPU/GPU Deep Collaborative Computing", Sensors 2016, 16, 494, pp. 1 to 13, Fan Zhang et al.

* cited by examiner

METHOD AND SYSTEM FOR SIMULATING A RADAR IMAGE

TECHNICAL FIELD

The present invention relates to the field of simulation of radar images, and more particularly to the field of simulation of real-time radar images.

BACKGROUND

To provide efficient flight training in critical environments for both commercial and military aviation, the flight simulator community is continuously improving the fidelity of the models. Radar simulations are among those which can benefit from performance improvements to increase realism, fidelity, and hence training effectiveness. This may be particularly important for the case of military Full Mission Simulators (FMS) where some crew members are dedicated to operate these sensors and analyze the data produced.

For example, Digital Radar Landmass Simulation (DRLMS) is particularly important for the air-to-ground radars and this aspect represents one of the biggest challenges to the radar simulation engineers due in part to the large size of the databases. This processing can take advantage of hardware with high computational power. With the advent of multi-core CPUs and massive parallel platforms such as GPUs, it is now possible to increase the simulation fidelity while maintaining the real-time user interactivity. But this could be guaranteed only by an efficient utilization of the hardware computation resources offered by these parallel platforms. Prior art solutions usually target a specific hardware and therefore lack flexibility.

Therefore, there is a need for an improved method and system that takes advantage of multi-core CPUs and/or massive parallel platforms for generating radar simulation images.

SUMMARY

According to a first broad aspect, there is provided a computer-implemented method for simulating an image of a terrain scanned by a simulated radar beam generated by a simulated radar antenna, comprising: calculating on a first processor a power reflected by the terrain while an orientation of the simulated radar antenna is varied within a scanning antenna range; calculating on a plurality of second processors a convolution power for the terrain while the orientation of the simulated radar antenna is varied within the scanning antenna range, said calculating on a first processor and said calculating on a plurality of second processors being performed concurrently and in parallel; combining the power reflected by the terrain and the convolution power, thereby obtaining combined data; generating a radar image using the combined data; and outputting the radar image.

In one embodiment, the method further comprises dividing the terrain into a plurality of range bins and assigning each range bin to a respective one of the plurality of second processors.

In one embodiment, a number of the range bins is greater than a number of the second processors, the method comprising the second processors concurrently calculating in parallel the convolution power for the respective ones of the plurality of range bins associated thereto.

In one embodiment, the second processors are part of a multi-core central processing unit (CPU).

In another embodiment, a number of the range bins is equal to a number of the second processors, the method comprising the second processors concurrently calculating in parallel the convolution power for a respective one of the plurality of range bins associated thereto.

In one embodiment, the second processors are part of a multi-core central processing unit (CPU).

In a further embodiment, a number of the range bins is less than a number of the second processors.

In one embodiment, the method further comprises: dividing each range bin into a plurality of thread blocks; assigning a respective one of the second processors to each thread block; and each one of the assigned second processors concurrently calculating in parallel the convolution power for the respective thread block.

In one embodiment, the second processors are part of a graphical processing unit (GPU).

In one embodiment, the scanning antenna range is 360 degrees.

In one embodiment, the step of outputting the radar image comprises displaying the radar image on a display unit.

According to another broad aspect, there is provided a system for simulating an image of a terrain scanned by a simulated radar beam generated by a simulated radar antenna, comprising: a first calculation unit comprising a first processor for calculating a power reflected by the terrain while an orientation of the simulated radar antenna is varied within a scanning antenna range; a second calculation unit comprising a plurality of second processors for calculating a convolution power for the terrain while the orientation of the simulated radar antenna is varied within the scanning antenna range, said calculating on a first processor and said calculating on a plurality of second processors being performed concurrently and in parallel; an image generating unit for combining the power reflected by the terrain and the convolution power to obtain combined data, generating a radar image using the combined data and outputting the radar image.

In one embodiment, the second calculation unit is further configured for dividing the terrain into a plurality of range bins and assigning each range bin to a respective one of the plurality of second processors.

In one embodiment, a number of the range bins is greater than a number of the second processors and the second processors are configured for concurrently calculating in parallel the convolution power for the respective ones of the plurality of range bins associated thereto.

In one embodiment, the second calculation unit comprises a multi-core central processing unit (CPU).

In another embodiment, a number of the range bins is equal to a number of the second processors and the second processors are configured for concurrently calculating in parallel the convolution power for a respective one of the plurality of range bins associated thereto.

In one embodiment, the second calculation unit comprises a multi-core central processing unit (CPU).

In a further embodiment, a number of the range bins is less than a number of the second processors.

In one embodiment, the second calculation unit is further configured for dividing each range bin into a plurality of thread blocks and assigning a respective one of the second processors to each thread block, and the second processors are configured for concurrently calculating in parallel the convolution power for the respective thread block.

In one embodiment, the second calculation unit comprises a graphical processing unit (GPU).

In one embodiment, the scanning antenna range is 360 degrees.

In one embodiment, the image generating unit is adapted to display the radar image on a display unit.

BRIEF DESCRIPTION OF THE DRAWINGS

Further features and advantages of the present invention will become apparent from the following detailed description, taken in combination with the appended drawings, in which.

DETAILED DESCRIPTION

Figure 1:
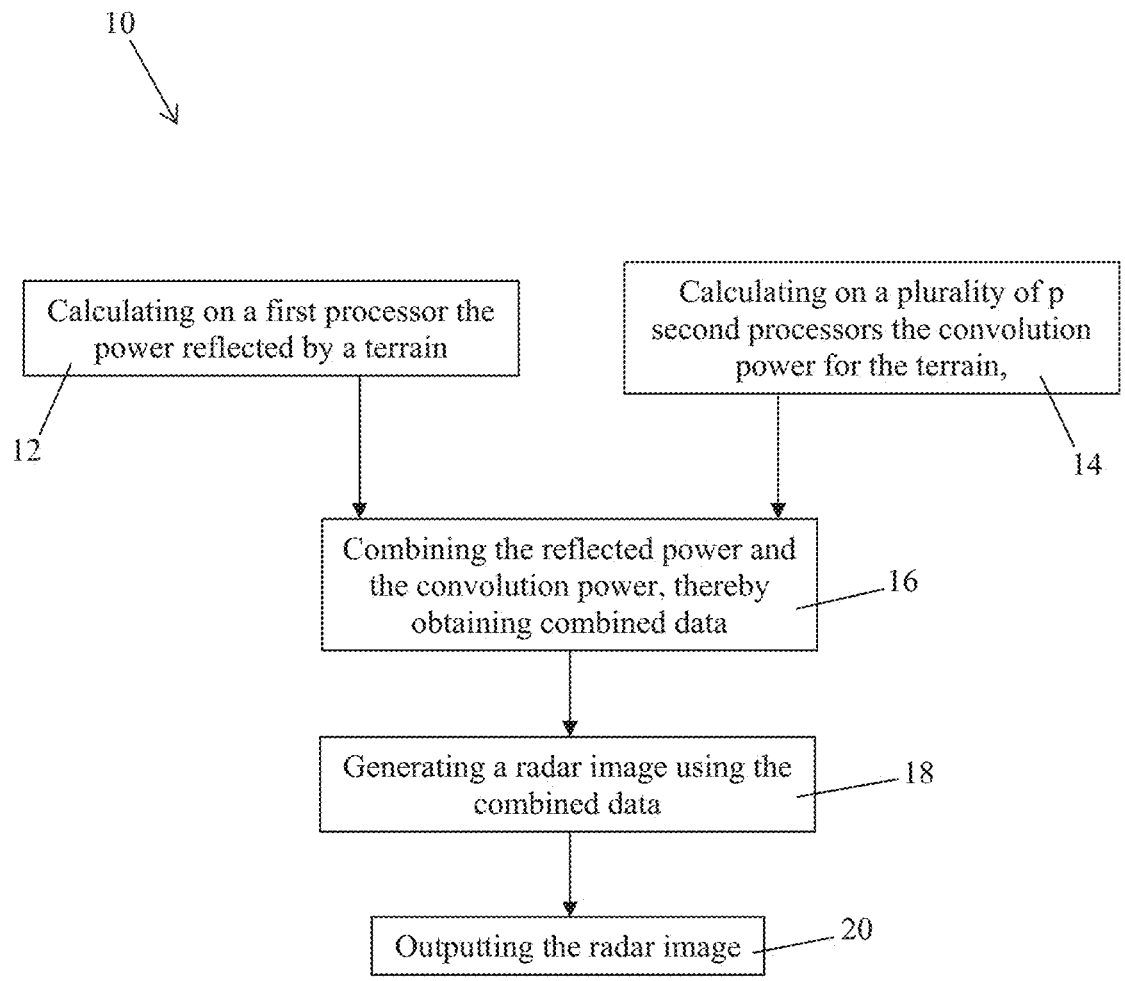
FIG. 1 is a flow chart illustrating a method for generating a simulated radar image, in accordance with an embodiment.

FIG. 1 illustrates one embodiment of a computer-implemented method 10 for generating a radar image. The simulated radar image represents a simulated terrain as seen by a simulated radar comprising a simulated radar antenna. The orientation of the simulated of the simulated antenna varies within a given scanning range so as to scan a given region of the terrain. In one embodiment, the scanning range of the simulated antenna is 360 degrees.

The method 10 comprises the step 12 of calculating on a first processor or processing unit the power reflected by the terrain while the simulated antenna scans the terrain according to the scanning range. It should be understood that a database comprises the characteristics of the terrain such as the topography of the terrain (i.e. the altitude of each point forming the terrain), the reflectivity of each point of the terrain, etc. Using the information about the terrain contained in the database, the first processor determines the power reflected by each point of the terrain illuminated by the simulated antenna using any adequate method as known in the art.

At step 14, at least two second processors concurrently calculate in parallel the convolution power for the terrain while the orientation of the simulated antenna is varied according to the scanning range. The convolution power is obtained using characteristics of the terrain and the antenna radiation pattern modeled both in azimuth and elevation and stored in the database, as described above with reference to Equation 1 (see page 10).

The steps 12 of calculating the reflected power and the step 14 of calculating the convolution power are performed concurrently and in parallel on the first processor and the second processors, respectively while the second processors are used in parallel to determine the convolution power for the terrain.

At step 16, the calculated reflected power and the calculated convolution power are combined together to obtain combined data. It should be understood that any adequate method for combining together the calculated reflected power and convolution power may be used.

At step 18, a radar image of the terrain is generated using the combined data obtained at step 16. In one embodiment, a greyscale value is assigned to each point of the terrain illuminated by the simulated radar beam generated by the simulated antenna.

At step 20 the generated image of the terrain is outputted. In one embodiment, the generated radar image of the terrain is display unit.

Figure 2:
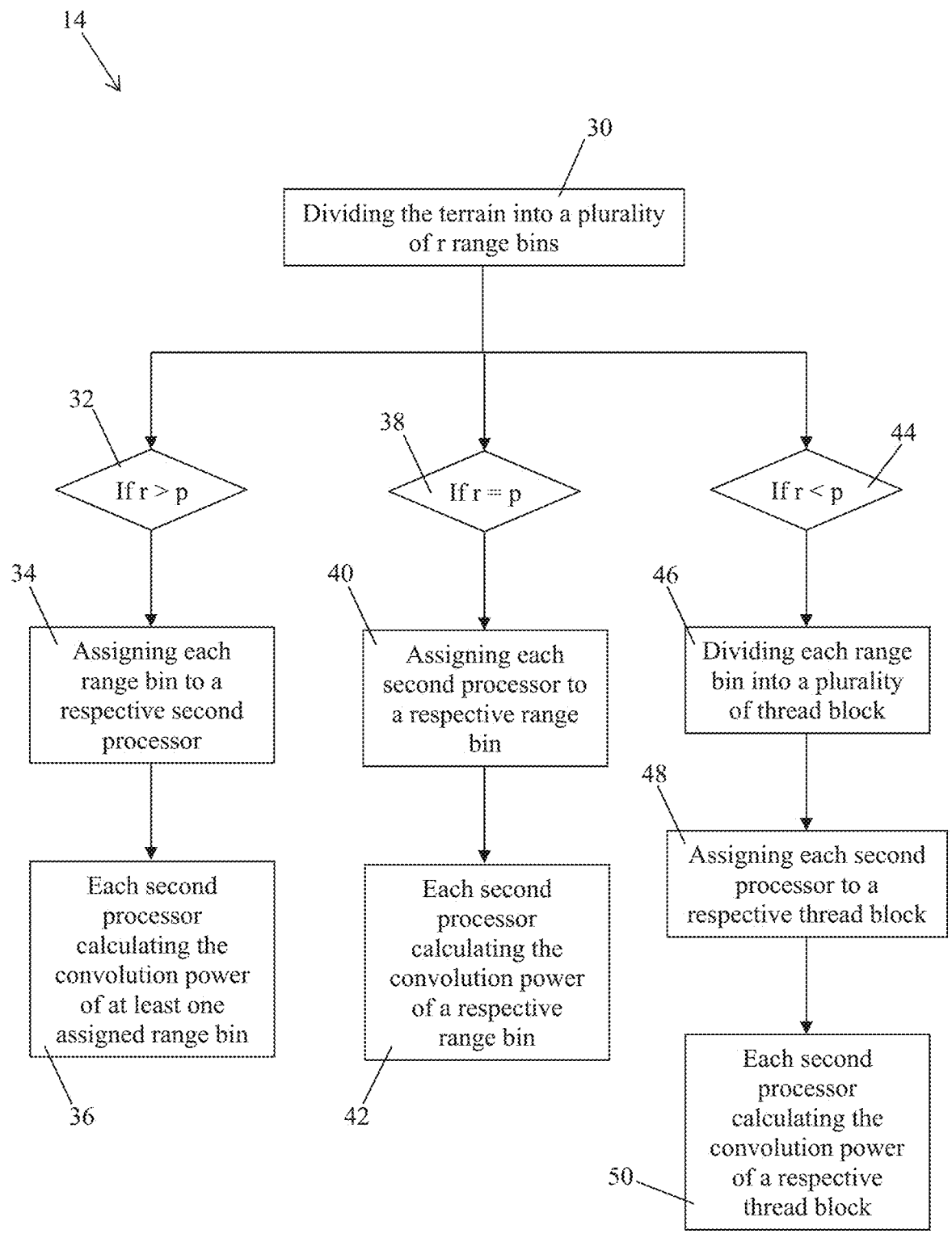
FIG. 2 is a flow chart illustrating a method for calculating a convolution power for a simulated terrain, in accordance with an embodiment.

FIG. 2 illustrates one embodiment of a method for performing the step 14 of the method 10. At step 30, the terrain is divided into a plurality of range bins. The range bins comprise a central disc and concentric annular regions. The number of range bins r is then compared to the number of second processors p.

In an embodiment 32 in which the number of range bins r is greater than the number of second processors p, the next step 34 consists in assigning each range bin to a respective second processor. Since the number of range bins r is greater than the number of second processors p, at least one second processor may have assigned at least two different range bins thereto. It should be understood that the assignment of the range bins to the second processors may be done randomly or using any adequate method.

Then at step 36, the second processors calculate in parallel the convolution power for each range bin that was assigned thereto. Each second processor first calculates the convolution power of the first range bin that was assigned thereto in parallel with the other second processors. The given second processors that have been assigned more than one range bin then calculate the convolution power of their assigned range bin. The second processors to which more than two range bins have been assigned, if any, calculate the convolution power of their third assigned range bin in parallel, etc.

For example, if r=p+1, (r−1) range bins will each be assigned to a respective and different second processor while the last range bin will be assigned to a given second processor that already has another range assigned thereto. In this case, the second processors all calculate in parallel the convolution power of their first assigned range bin and once completed, the given processor to which two range bin have been assigned calculates the convolution power of its second assigned range bin.

In another embodiment 38 in which the number of range bins r is equal to the number of second processors p, each second processor is assigned a single and respective range bin at step 40.

Then at step 42, the second processors calculate in parallel the convolution power of their respective range bin.

The embodiments 32 and 38 of the method step 14 may be used when the second processors are part of a multi-core central processing unit (CPU).

In a further embodiment 44 in which the number of processors p is greater than the number of range bins r, each range bin is divided into a plurality of thread blocks at step 46, as described below in connection with FIG. 9b.

Then at step 48, each second processor is assigned to a respective thread block and the second processors calculate in parallel the convolution power of their respective thread block at step 50.

The embodiment 44 of the method step 14 may be used when the second processors are part of a massive parallel platform such as a graphical processing unit (GPU).

Figure 3:
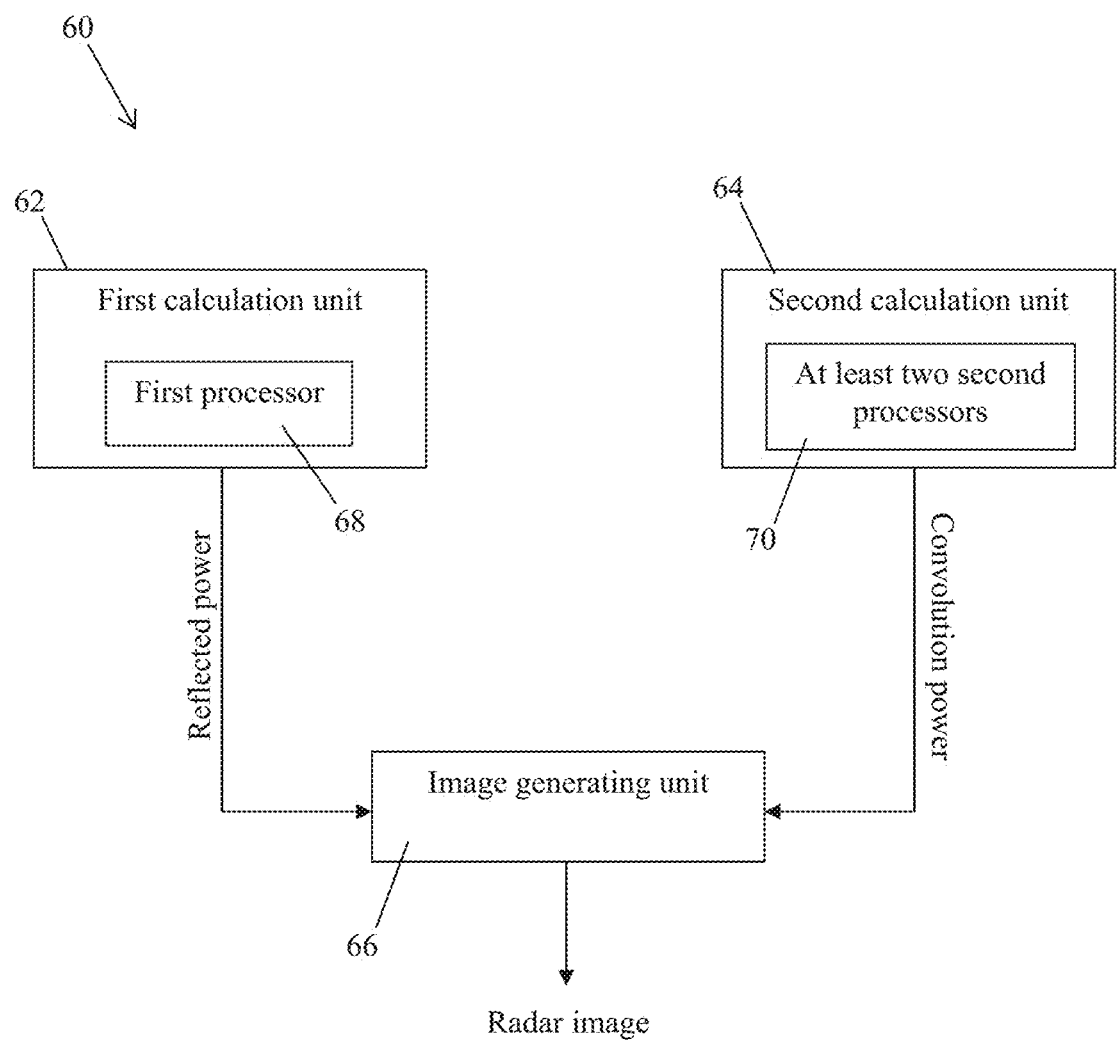
FIG. 3 is a block diagram illustrating a system for generating a simulated radar image, in accordance with an embodiment.

FIG. 3 illustrates one embodiment of a system 60 for generating a radar image of a terrain. The system 60 comprises a first calculation unit 62, a second calculation unit 64 and an image generating unit 66. The calculation unit 62 comprises a first processor 68 while the second calculation unit 64 comprises at least two second processors 70.

The first calculation unit 62 is adapted to perform the step 12 of the method 10 using the first processor 68 to obtain the reflected power while the second calculation unit 64 is adapted to perform the step 14 of the method 10 using the plurality of second processors 70 to obtain the convolution power. As a result, the first calculation unit 62 and the second calculation unit 64 operate in parallel to obtain concurrently determine the reflected power and the convolution power. The second processors 70 also operate in parallel to determine the convolution power.

Once the reflected power for the terrain has been determined by the first calculation unit 62 and the convolution power has been determined by the second calculation unit 64, the image generating unit 66 performs the steps 16 to 20 of the method 10 to output a radar image of the terrain.

In one embodiment, the steps 30, 34, 40, 46 and/or 48 are performed by at least one of the first processor 68 and at least one of the second processors 64. In the same or another embodiment, at least a third processor is performing at least one of the steps 30, 34, 40, 46 and 48.

In the following, there is described a specific context into which the above described method 10 and system 60 may be used as well as exemplary embodiments.

Radar uses electromagnetic waves to detect and/or track significant objects, depict the landmass, identify areas of precipitation (rain, snow, etc.), monitor airborne or sea-surface traffic, etc. Significant objects may comprise static or mobile objects and 2D or 3D objects, such as airborne objects e.g. aircrafts; marine objects e.g. boats, submarine; land objects e.g. tank, cars, etc. Radio frequency pulses are emitted from an antenna and propagate through space. The orientation of the antenna as well as its radiation pattern determines the amount of energy sent in a particular direction. The antenna will receive the energy that is reflected (echoes) by objects in the environment. Some of these objects will affect the propagation, such as the presence of precipitation which can attenuate the pulse, or the presence of mountains which can block it completely. This will make other objects behind more difficult or impossible to detect.

Figure 4:
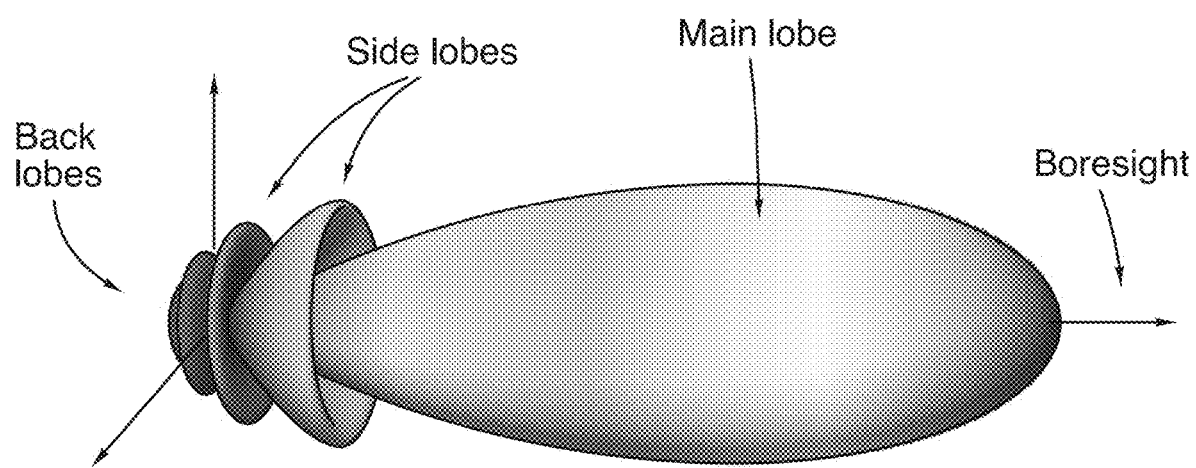
FIG. 4 illustrates a typical radar antenna radiation pattern represented as gain vs. direction, in accordance with the prior art.

The main purpose of the radar antenna is to determine the angular direction of the detected objects. During transmission, it concentrates the energy into a directive beam and plays an equivalent role at reception, capturing more of the signal from that direction. To achieve a high resolution, a very narrow beam is ideal. However, mechanical and electromagnetic constraints are such that antennas have a non-negligible beamwidth and also leak radiation in other directions called side lobes as illustrated in FIG. 4. This creates ambiguity as reflectors from other directions can contaminate the signal coming from the direction the antenna is pointing at. On a radar display this will make the targets (landmass, ships, aircrafts, etc.) appear blurred in azimuth. From the point of view of a radar operator, this is an undesired effect. In simulation, this phenomenon should be modeled for realism, at an additional computational cost.

The radiation pattern depends on the physical characteristics of the antenna and the wavelength/frequency of the transmitted signal. Different beam shapes are used depending on the purpose of the radar, such as pencil beam, fan beam or cosecant squared beam. It should be understood that the present method is not limited to any beam shape.

In the following, two parallel hardware platforms are investigated: (1) multi-core CPUs and (2) general purpose GPUs (GPGPUs).

Multi-core CPUs: this type of platform refers to general-purpose processors integrating multiple cores in the same die. In general, these cores are identical and they are based on x86 architecture. Current multi-core CPUs are limited to the order of tens of cores running tens of threads. Nevertheless, multi-core CPU is considered as a convenient platform to accelerate compute-intensive applications thanks to the programming flexibility.

GPGPUs: the application of GPUs is no longer restricted to graphics applications. During the last years, many compute-intensive applications were accelerated on GPGPUs. The current GPUs are seen as general-purpose many-core platforms that integrate a large number of cores distributed on a number of streaming multiprocessors (SM). Moreover, the GPU platform is able to run a large number of simultaneous threads, which offers further parallelism.

In order to program parallel hardware platforms, specific parallel programming models are used in the following. The programming models allow the programmer to express the parallelism of the application without the need to write a low-level multithreaded code. The programming models show certain architecture features such as the parallelism level, the type of parallelism, and the abstraction degree of the components' functions. Parallel programming models are implemented as a set of languages, extensions of existing languages, libraries and tools to map applications on parallel hardware.

OpenMP: OpenMP is a standard shared-memory programming model. It is designed as an API used to explicitly enable multithread execution on multi-core CPUs. The main feature of OpenMP is the ease of use by providing the capability to incrementally parallelize a sequential program. Moreover, it is capable of implementing both task and data parallelism models.

CUDA and OpenCL: Among the most popular programming models for GPUs are Compute Unified Device Architecture (CUDA) developed by NVIDIA™ to program their GPUs, and Open Computing Language (OpenCL) developed by Khronous™ which targets many GPU platforms including NVIDIA GPUs and AMD ATI GPUs. Both CUDA and OpenCL are extensions of the C language and implement a particular runtime to manage the computation on GPU. CUDA and OpenCL adopt the same philosophy for their runtime models. Threads in both programming models are organized as a hierarchy of 3D grids and 3D blocks in order to match the dataset organization. Threads belonging to the same block are assigned to the same streaming multiprocessor. While CUDA is a vendor-specific programming model, OpenCL is generic and supports several parallel platforms. The higher flexibility of OpenCL compared to CUDA comes with an overhead in term of lines of code and sometimes a slightly lower performance when running on NVIDIA™ GPUs. In this work, we implement two parallel versions of the DRLMS on GPU, one using CUDA and the other using OpenCL in order to offer respectively the best performance when targeting NVIDIA™ GPUs, and the flexibility in term of implementation.

Keeping in mind the notions of the above, the key to improve performance is to identify and group calculations that can be done in parallel (or not) in the radar simulation. The simulation is decomposed to express parallelism, considering the following observations from radar point of view:

objects in the environment can modulate or block the power reaching other objects beyond, but on the same azimuth; and the antenna pattern will blend objects that are at the same range.

Thus, the first point indicates that power calculations will depend on results from closer ranges, but will be independent in azimuth. The second point suggests the opposite for the modeling of the radiation pattern effects. Therefore, the present approach decomposes the simulation in two stages: the power accumulation stage (hereinafter referred to as the accumulation stage or Accumulation) in which the power reflected by s simulated terrain is calculated, and the antenna pattern convolution stage (hereinafter referred to as the convolution stage or Convolution) in which the convolution power for the simulated terrain is calculated.

Figure 5:
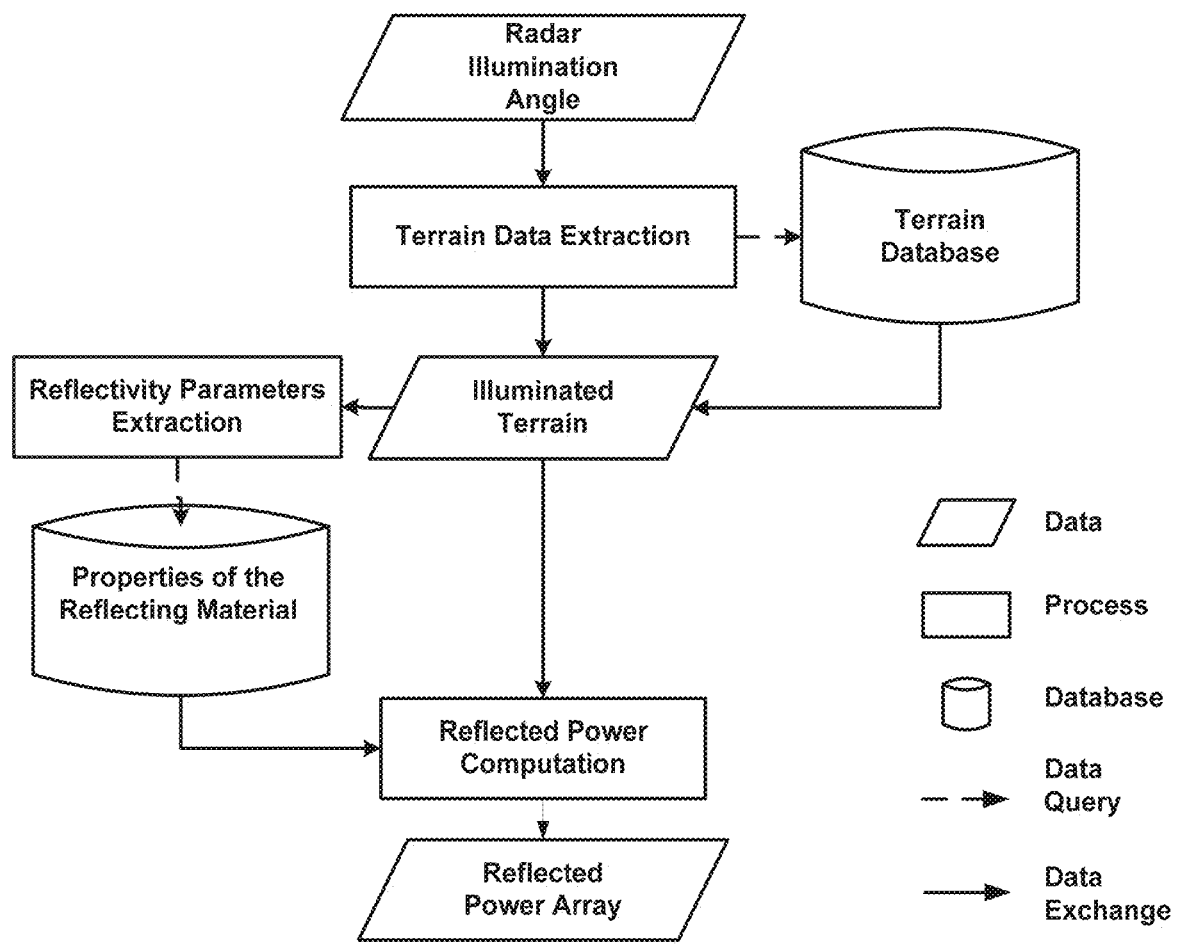
FIG. 5 is a flow chart illustrating a method for calculating the power reflected by a simulated terrain, in accordance with an embodiment.
Figure 6A:
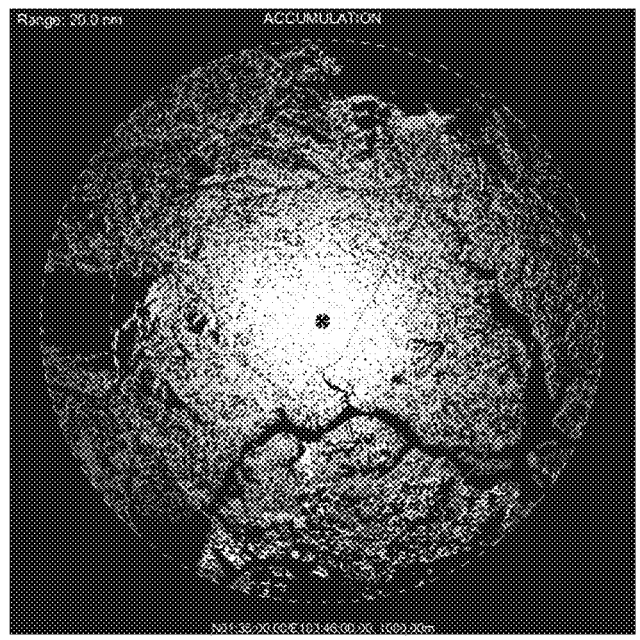
FIG. 6a illustrates the power reflected by a simulated terrain for an isotropic antenna; in accordance with an embodiment.

The main steps of the accumulation are shown in FIG. 5. As the radar platform moves, its new position is fed to the simulation, which sets the origin of the illumination. Based on this location, the simulation maps a particular region (landmass) represented as tiles of terrain elevation (digital elevation model) and culture (points, lines, surfaces and 3D models or polygons) that are extracted from a database. Then, the respective reflectivity parameters (dielectric properties, orientation, directivity, etc.) of the surfaces, building structures, streets, trees, terrain, moving targets, etc. are extracted. The echoes and attenuations caused by precipitation are also added at this stage. The returns will be represented as a 2D array of samples. The first dimension represents the azimuth angles ranging from 0 to 360 degrees sampled according to a given angle resolution. The second dimension represents the range bins where the number of range bins defines the range resolution of the radar. Each array element contains the power reflected by landmass and precipitation assuming the illumination source is an isotropic antenna with a gain of 1. FIG. 6a is an example of such power returns where the intensity has been converted in shades of grey.

The antenna radiation pattern is modeled in both elevation (El) and azimuth (Az). For a given antenna orientation, the antenna pattern is applied on the surrounding samples at the neighbor azimuth angles for each range bin ($r_i$) using Equation 1.

$$P_{out}(r_i) = \sum_{Az=0}^{360} P_{in}(r_i, Az) \cdot G^2(Az, El(r_i)) \quad \text{Eq. 1}$$

Figure 6B:
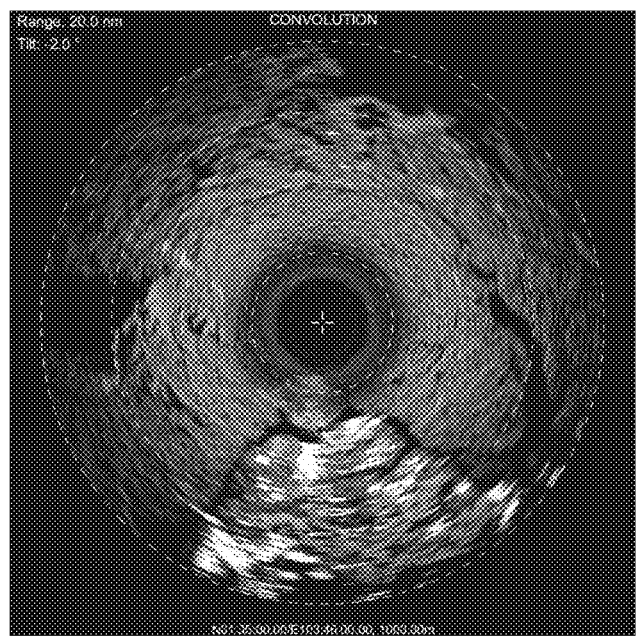
FIG. 6b illustrates the convolution power for a simulated terrain and a sin(x)/x antenna pattern with a 3-degree beamwidth on the accumulation array, after a complete scan; in accordance with an embodiment.

The result of this convolution is an array of powers ($P_{out}$) indexed by range at the specified azimuth. This process is repeated for each azimuth angle as the antenna scans around. FIG. 6b is an example of the convolution after a complete scan (360 degrees) where the intensity has been converted into shades of grey. The antenna radiation pattern was given a sin(x)/x shape (such as illustrated in FIG. 4) with a main lobe beamwidth of 3 degrees. The sin(x)/x function, where x is the angular distance from the boresight, is a widely-used approximation for common radar antennas, but this parallelization solution remains applicable for any antenna pattern with any beamwidth without additional cost.

Figure 7:
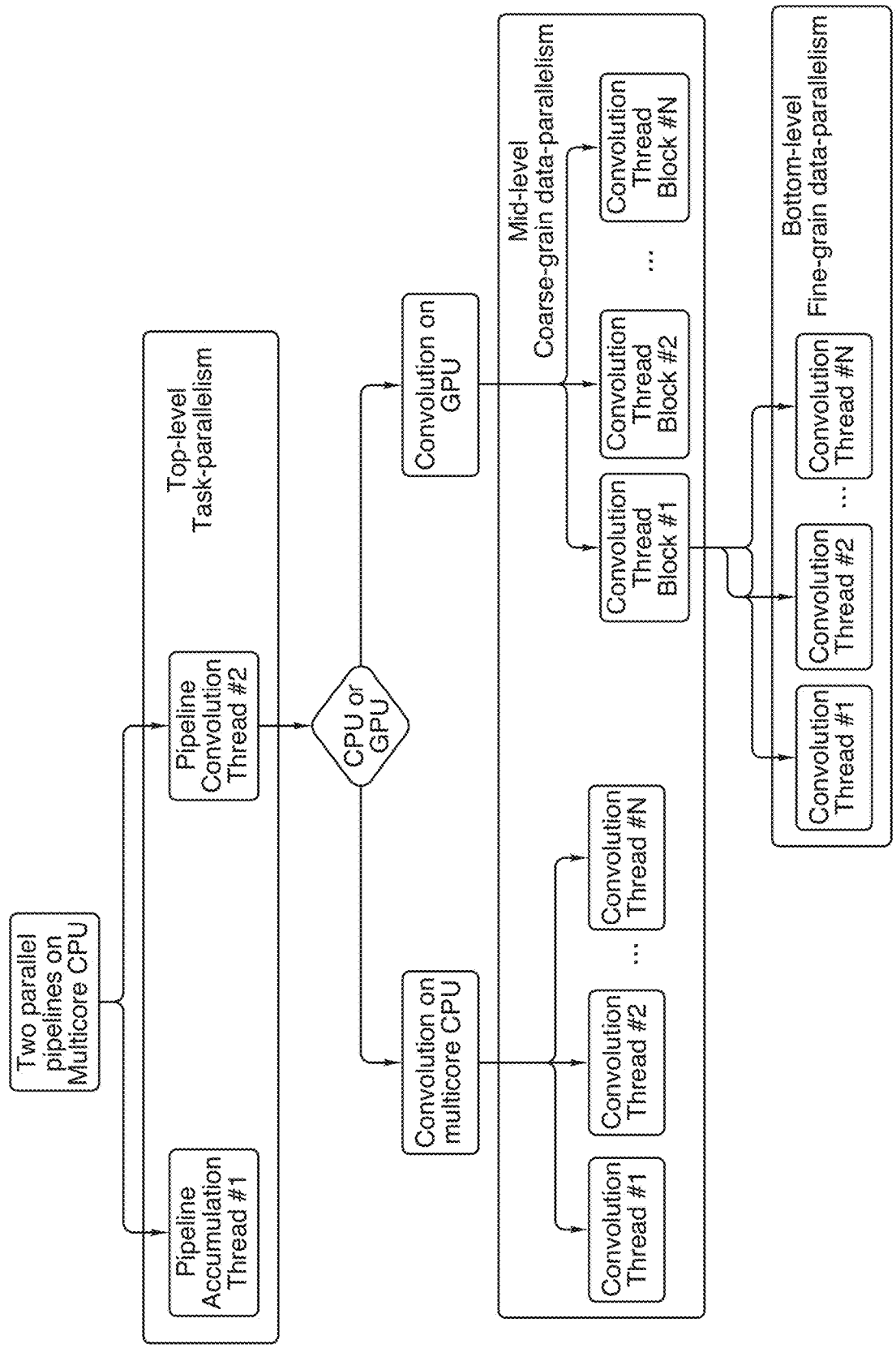
FIG. 7 is a flow chart illustrating a parallelization hierarchy of Digital Radar Landmass Simulation (DRLMS), in accordance with an embodiment.

Several parallelism levels may be exploited in the processing involved in DRLMS. At the top level, it is decomposed in two parallel tasks (Accumulation and Convolution) where the task-parallelism model is expressed. At the mid-level, the coarse-grain data processing for the convolution task is analyzed and expressed following data-parallelism model. At the bottom level, finer-grain data-parallelism is exploited by decomposing further the convolution task in elementary data processing. Since multi-core CPU and GPU show many differences regarding the architectural aspects, the present hierarchical parallelism representation is adopted to be suitable for both parallel platforms. Multi-core CPU is a control-oriented architecture integrating a limited number of cores which makes this architecture more efficient for coarse-grain task-parallelism and coarse-grain data-parallelism (see FIG. 7). GPU, on the other hand, is a hierarchical data-oriented architecture, which is composed of a fair number of streaming multiprocessors, which integrates in turn a large number of cores. Therefore, both coarse-grain and fine-grain data-parallelism are well supported by such architecture (see FIG. 7).

In order to accelerate the DRLMS processing, the simulation is performed in two steps.

Figure 8A:
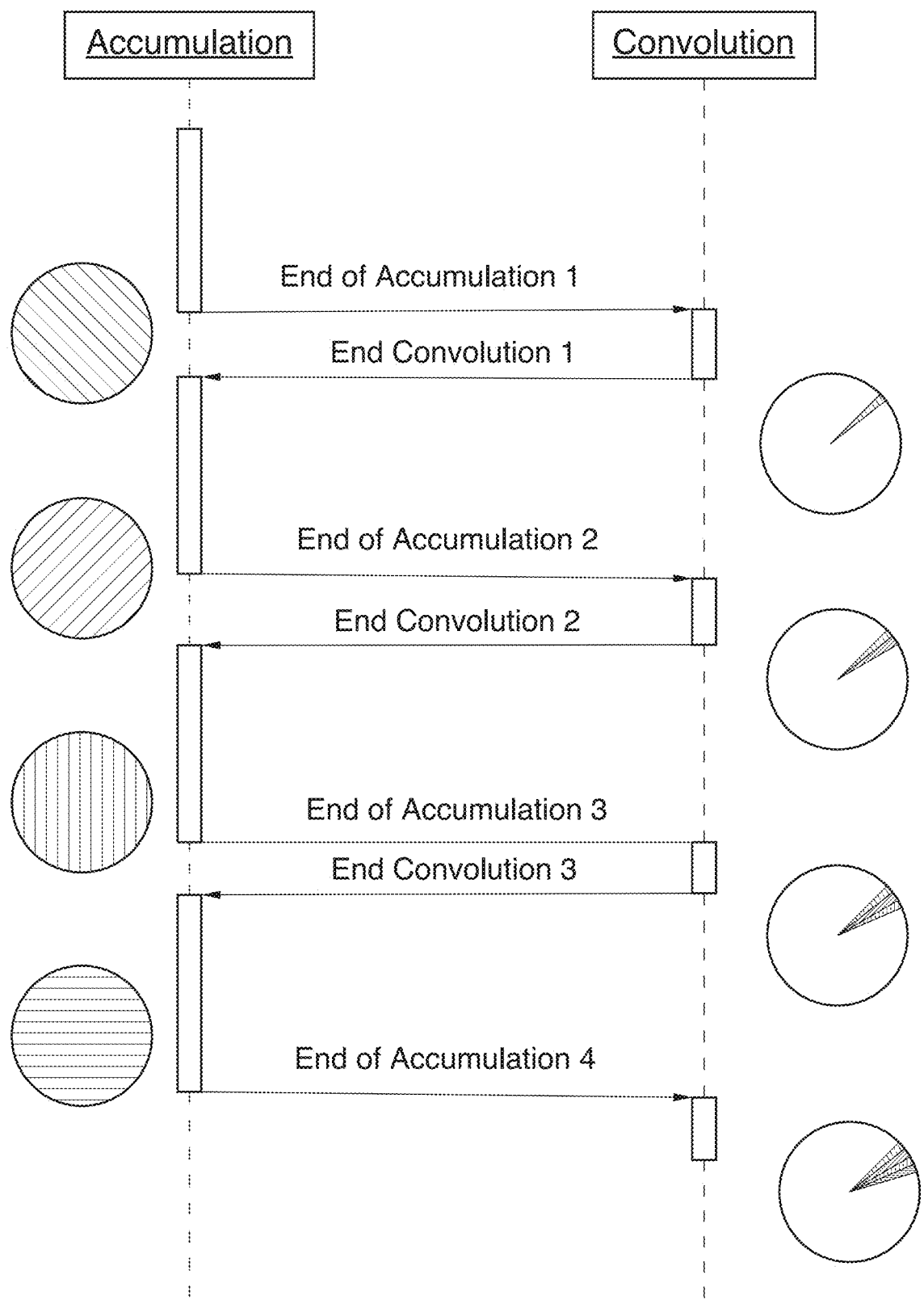
FIG. 8a illustrates a serial implementation for DRLMS, in accordance with the prior art.
Figure 8B:
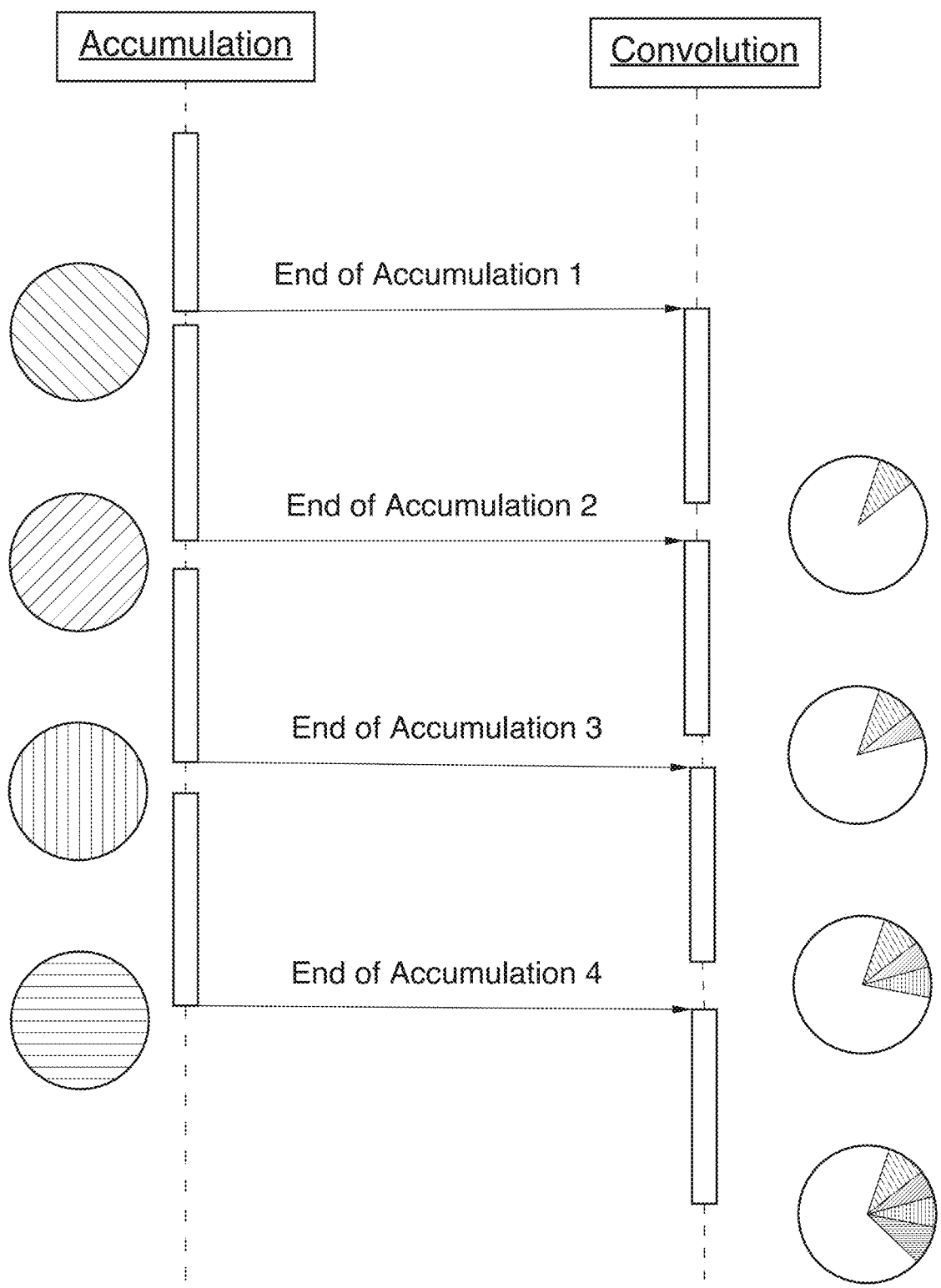
FIG. 8b illustrates a parallel implementation for DRLMS, in accordance with an embodiment.

To hide the Accumulation processing time, the Accumulation and the Convolution are overlapped by running the two stages in parallel in two separate CPU threads following functional parallelism model. By doing this, the convolution will run on one disk of power while the accumulation can process a new disk of power. To keep the two stages running asynchronously, a double buffer mechanism is implemented for each stage. In one embodiment, one of the main advantages of this approach is that the computational cost of convolution is now independent of the content of the database. In practice, some parts of a database may be populated with a lot of complex 3D objects such as in urban areas vs. rural areas. With a serial implementation, the computation time required for an azimuth will depend on the amount of these features hit by the radar beam in this direction. This results in an uneven scan speed on the operator's display, unless sleep time is introduced to balance processing time, which is a waste of computational resources. FIG. 8a shows the prior art sequence diagram of a serial execution of the accumulation followed by the convolution stage and FIG. 8b shows the sequence diagram of the present parallel pipeline running the accumulation and the convolution. In the latter diagram, the Accumulation stage and the Convolution stage are overlapped. If we consider that each colored disk represents a new accumulated data and each respective colored sector represents the convolved power, we can note that thanks to this parallelization, the DRLMS is now able to scan faster than serial implementation. Furthermore, since in the accumulation stage power levels from one azimuth are independent of those of other azimuths, these can be treated in parallel if needed.

Figure 9A:
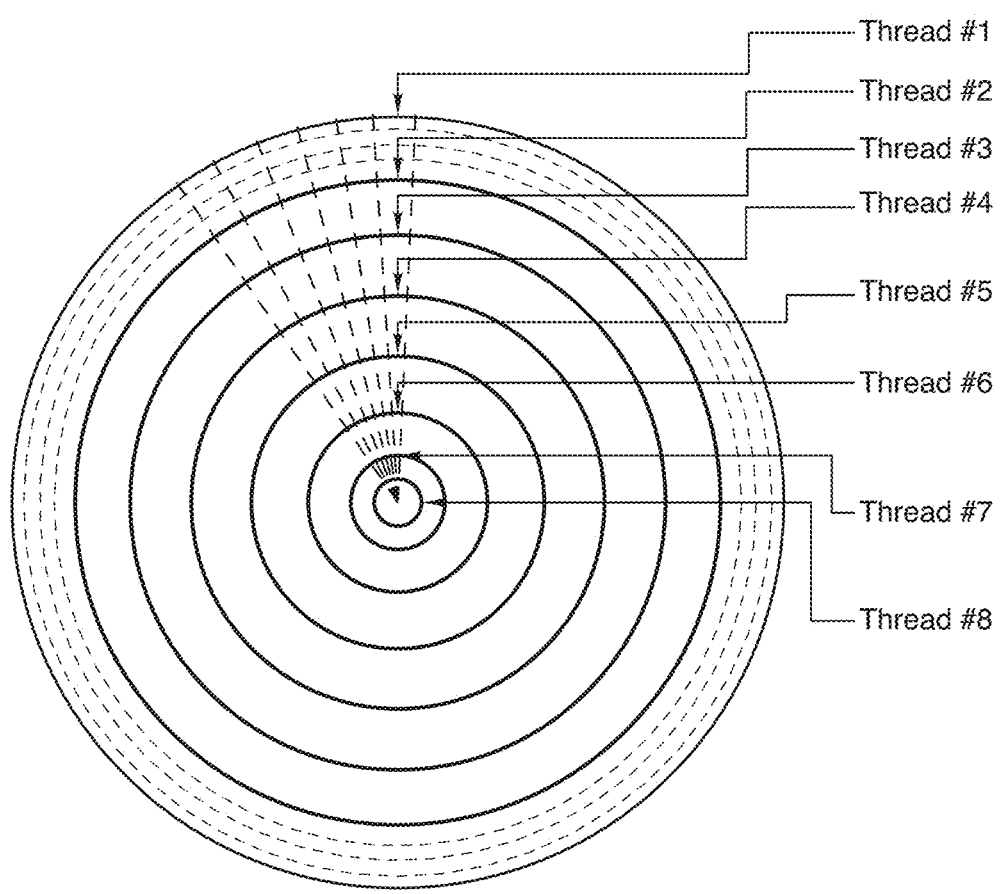
FIG. 9a illustrates the parallelization of convolution on a multi-core CPU, in accordance with an embodiment.
Figure 9B:
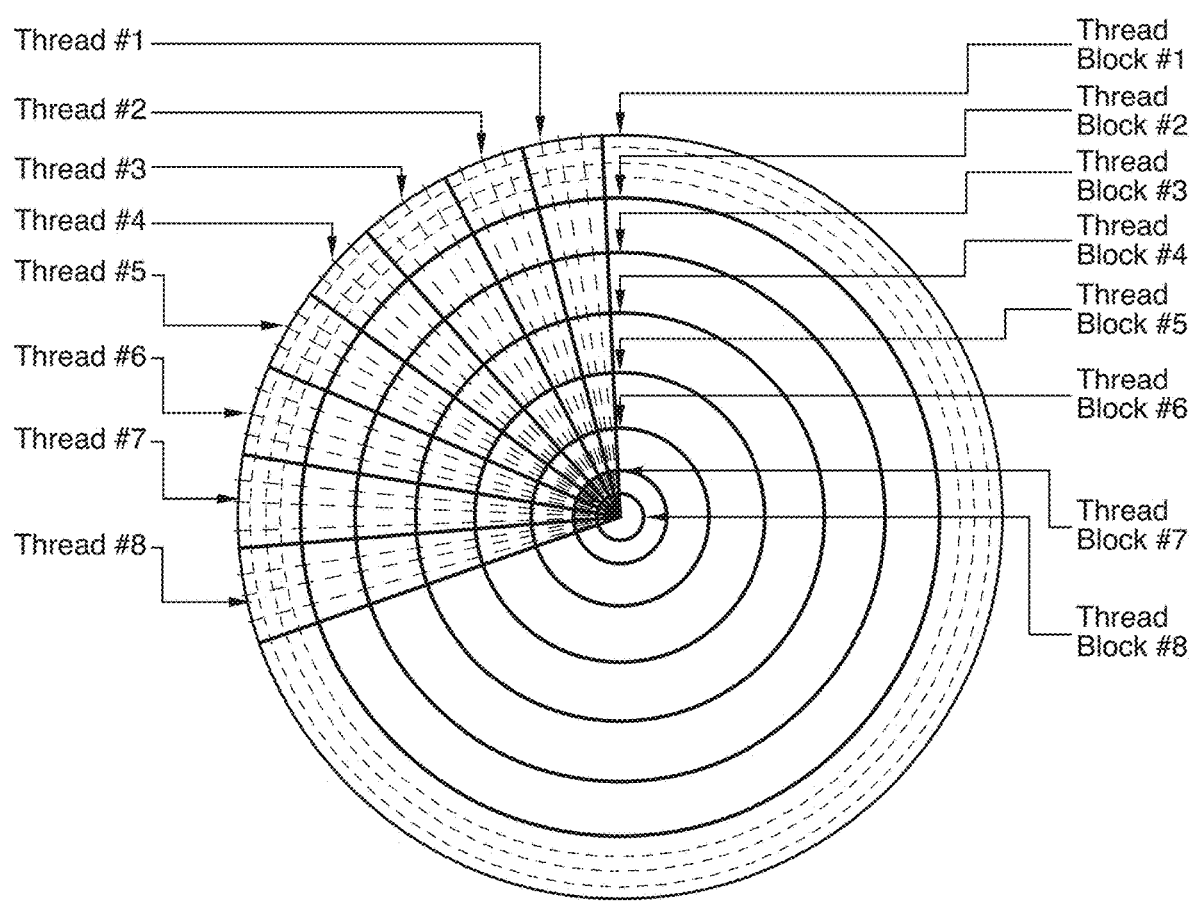
FIG. 9b illustrates the parallelization of convolution on a GPU, in accordance with an embodiment.

The Convolution is parallelized on the remaining multi-core CPU threads or on the GPU. In this stage, range bins do not impact other range bins. Therefore, all range bins can be calculated in parallel. The power at each range bin belonging to a given azimuth is computed using Equation 1. The antenna gain is a function of the azimuth angle and the elevation angle. This type of parallelism is known as data-parallelism. Since the number of available CPU cores (24) is less than the number of bins (512, 1024, 2048 or 4096), each CPU thread must process a set of range bins (see FIG. 9a). On the other hand, since the number of GPU threads is way larger than the number of range bins, one level of parallelism is not sufficient to take advantage of the full computation power of the GPU. A two-level parallelism approach is considered:

- the first level is to decompose the range bins along thread blocks as each thread block will process a ring of subset of range bins; and
- in the second level, each ring assigned per thread block is divided on the threads belonging to that block as each thread will compute a partial convolution along a single sector of this ring (see FIG. 9b). Finally, all partial convolution results are summed by one thread of each thread block to form the output power at a given range bin.

As a result, the multi-level parallelization of DRLMS was implemented as follow: the task-level parallelism is implemented as two CPU threads using the parallel sections directive of OpenMP and the data-parallelism is implemented as a multi-threaded processing on multi-core CPU using the parallel for directive of OpenMP while the data-parallelism on GPU is implemented as two versions one using CUDA and the other using OpenCL for the sake of programming flexibility.

Experiments were conducted on a desktop computer integrating both a multi-core CPU and a GPU with the specifications listed in Table 1.

TABLE 1

Hardware Platform Specifications

| Parallel Platform | Multi-core CPU | GPU (refer to NVIDIA 2016) |
|---|---|---|
| Manufacturer | Intel | NVIDIA |
| Model | Xeon E5-2620 v2 | GTX 1080 (GP104) |
| # of processors | 2 | 20 SM |
| # of cores | 12 | 2560 |
| Base Clock | 2100 MHz | 1603 MHz |
| Maximum # of threads | 24 | 40960 (2048×20) |
| Maximum # of thread Blocks | N/A | 640 (32×20) |
| Global Memory Size | 16 GB | 8 GB |
| Shared Memory Size | N/A | 96 KB per SM |

In the experiments, DRLMS were run with range resolutions from 512 to 4096 bins and azimuth resolutions of 0.25 and 0.5 degree. Even though it is not always required depending on the type of radar, the convolution is applied on 360 degrees in azimuth in order to work with the worst case as a baseline. The execution times of the convolution at different resolutions are given in Table 2. The execution time of the serial convolution of a whole disk at low resolution running on one thread is around 11 s, which is not practical for a real-time simulation while the parallel version on 16 cores can take only 1 s, which is suited for real-time simulator. The GPU takes only 1.5 s to produce the whole 360-degree convolution for 4096 range bins and 0.25 degree of azimuth resolution. The performance of GPU outperforms the 16-core CPU by a speedup of 22× and 1-core CPU by a speedup of 250×. We show also that the GPU scales better than multi-core CPU with the computation complexity by offering a higher speedup when the resolution is higher.

TABLE 2

Acceleration Performances on Multi-core CPU and GPU.

| | CPU 1 core | CPU 2 cores | CPU 4 cores | CPU 8 cores | CPU 16 cores | GPU* (CUDA) |
|---|---|---|---|---|---|---|
| 512 bins, 0.5° azimuth resolution | | | | | | |
| Execution Time (s) | 11.5 | 5.8 | 3.1 | 1.7 | 1.1 | 0.3 |
| Speedup (x) | 1.0 | 1.9 | 3.7 | 6.7 | 10.3 | 40.0 |
| 2048 bins, 0.5° azimuth resolution | | | | | | |
| Execution Time (s) | 46.8 | 23.0 | 12.2 | 6.4 | 4.3 | 0.5 |
| Speedup (x) | 1.0 | 2.0 | 3.8 | 7.2 | 10.8 | 100.0 |
| 2048 bins, 0.25° azimuth resolution | | | | | | |
| Execution Time (s) | 188.6 | 94.3 | 47.5 | 26.6 | 16.6 | 1.1 |
| Speedup (x) | 1.0 | 2.0 | 3.9 | 7.1 | 11.4 | 174.6 |
| 4096 bins, 0.25° azimuth resolution | | | | | | |
| Execution Time (s) | 374.4 | 187.2 | 93.6 | 54.0 | 33.1 | 1.5 |
| Speedup (x) | 1.0 | 2.0 | 4.0 | 6.9 | 11.3 | 247.6 |

*Performances obtained with OpenCL did not significantly differ from those obtained with CUDA.

While the multi-core CPU offers an acceptable performance improvement of the simulation, it is only applicable for real-time low and mid-resolution simulation. This is explained by the low number of threads that can run in parallel on such platform. Moreover, the achieved speedup on multi-core CPU does not scale well with the data parallelism granularity (high number of range bins and azimuth resolution) due to the overhead for managing the running threads (see Table 2). On the other hand, the GPU offers significant performance improvement suited for real-time high resolution simulation. The huge number of light managed threads that can run in parallel on GPU is well suited for large parallel data processing. A parallel application could take the maximum of the GPU when the processing/data access ratio is more significant. This is also shown in Table 2 where the number of range bins and azimuth resolution is increasing. This explains the good scalability of the GPU with the large data parallelism.

In one embodiment, although the GPU provides high performance, it is limited to data-parallelism while the multi-core CPU is essential to implement the task-parallelism (overlapping data extraction and data processing). Moreover, the higher performance provided by the GPU compared to the CPU comes with a cost of more programming and debugging effort to port the dependencies on the GPU and to manage the data exchange between CPU and GPU.

Besides these considerations other practical aspects must be taken into account when deciding whether to opt for a multi-core CPU or a GPGPU approach. The need for additional CPU resources pushes towards the GPGPU solution. For instance, the CPU time savings could be applied to the simulation of a track-while-scan function or a terrain-following model. Both would use the result of the convolution as an input. On the other hand, adding one GPGPU-capable graphics card can have an impact on the cost of a simulator. The cost increases not only for the part itself, but also for the effort of maintaining documentation and schematics, managing obsolescence, etc. for one computer in the computing complex of a full mission simulator.

In the above, a multi-level approach was provided to implement a nested task- and data-parallel application on both multi-core CPU and GPU. This approach is experimented with the parallel implementation of DRLMS as part of a training simulator. In particular, this approach enables the efficient utilization of available computing resources of both CPU and GPU cores to accelerate DRLMS. As results, it was shown that the simulation performances were improved since high resolution DRLMS were simulated at real-time on GPU while applying a realistic radar antenna radiation pattern. By combining these two strategies: 1) splitting the landmass simulation in two main processes, accumulation and convolution, and 2) parallelizing the convolution, a regular scan rate was obtained even when scanning over a densely or unevenly populated database. The parallelization of DRLMS on multi-core CPU running 16 threads shows a speedup of 12× while the parallelization on GPU shows a speedup of 250×.

In one embodiment, the accumulation stage may be parallelized. That would allow handling databases with higher densities. To accomplish this, the following scheme may be used:

parallelized accumulation on multi-core CPU; and
multi-level parallelization of convolution on GPGPU.

This would make an optimal usage of the computing resources of a standard multi-core PC equipped with a GPGPU.

Besides radar, other sensor simulations could use this multi-level approach. Underwater acoustics is probably the most similar example because of the emission and reception, with various beam shapes, of energy that can bounce on the ocean floor. Our multi-level approach could also be used to implement applications in the image processing field where the data loading and data processing could run in parallel as two overlapping pipeline while the data processing could run in parallel on each separate image block of pixels and separate pixels.

Figure 10:
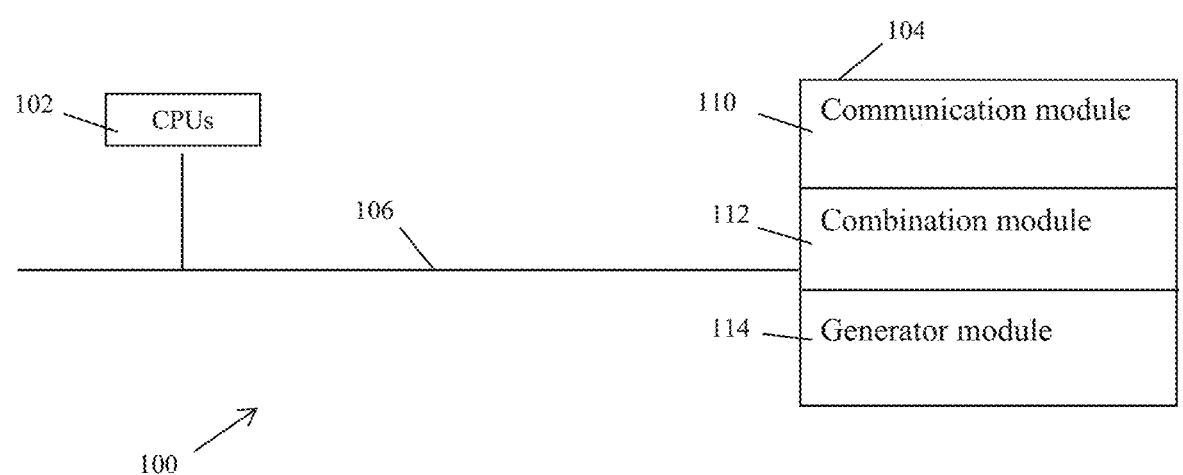
FIG. 10 is a block diagram of a processing module adapted to execute at least some of the steps of the method of FIG. 1, in accordance with an embodiment It will be noted that throughout the appended drawings, like features are identified by like reference numerals.

FIG. 10 is a block diagram illustrating an exemplary processing module 100 for executing the steps 16 to 20 of the method 10, in accordance with some embodiments. The processing module 100 typically includes one or more Computer Processing Units (CPUs) and/or Graphic Processing Units (GPUs) 102 for executing modules or programs and/or instructions stored in memory 104 and thereby performing processing operations, memory 104, and one or more communication buses 106 for interconnecting these components. The communication buses 106 optionally include circuitry (sometimes called a chipset) that interconnects and controls communications between system components. The memory 104 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 104 optionally includes one or more storage devices remotely located from the CPU(s) 102. The memory 104, or alternately the non-volatile memory device(s) within the memory 104, comprises a non-transitory computer readable storage medium. In some embodiments, the memory 104, or the computer readable storage medium of the memory 84 stores the following programs, modules, and data structures, or a subset thereof:

a communication module 110 for receiving the power reflected by a terrain from a first processor and the convolution power for the terrain from a second processor, and outputting the radar image;

a combination module 112 for combining the reflected power and the convolution power to obtain combined data; and a generator module 114 for generating a radar image using the combined data.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 104 may store a subset of the modules and data structures identified above. Furthermore, the memory 104 may store additional modules and data structures not described above.

Although it shows a processing module 100, FIG. 10 is intended more as functional description of the various features which may be present in a management module than as a structural schematic of the embodiments described herein. In practice, and as recognized by those of ordinary skill in the art, items shown separately could be combined and some items could be separated.

The embodiments of the invention described above are intended to be exemplary only. The scope of the invention is therefore intended to be limited solely by the scope of the appended claims.

We claim:

1. A computer-implemented method for simulating an image of a terrain scanned by a simulated radar beam generated by a simulated radar antenna, comprising:
   calculating on a first processor a power reflected by the terrain while an orientation of the simulated radar antenna is varied within a scanning antenna range;
   calculating on a plurality of second processors a convolution power for the terrain while the orientation of the simulated radar antenna is varied within the scanning antenna range, said calculating on a first processor and said calculating on a plurality of second processors being performed concurrently and in parallel;
   combining the power reflected by the terrain and the convolution power, thereby obtaining combined data;
   generating a radar image using the combined data; and
   outputting the radar image.

2. The computer-implemented method of claim 1, further comprising dividing the terrain into a plurality of range bins and assigning each range bin to a respective one of the plurality of second processors.

3. The computer-implemented method of claim 2, wherein a number of the range bins is greater than a number of the second processors, the method comprising the second processors concurrently calculating in parallel the convolution power for the respective ones of the plurality of range bins associated thereto.

4. The computer-implemented method of claim 2, wherein a number of the range bins is equal to a number of the second processors, the method comprising the second processors concurrently calculating in parallel the convolution power for a respective one of the plurality of range bins associated thereto.

5. The computer-implemented method of claim 4, wherein the second processors are part of a multi-core central processing unit (CPU).

6. The computer-implemented method of claim 2, wherein a number of the range bins is less than a number of the second processors.

7. The computer-implemented method of claim 6, further comprising:
   dividing each range bin into a plurality of thread blocks;
   assigning a respective one of the second processors to each thread block; and
   each one of the assigned second processors concurrently calculating in parallel the convolution power for the respective thread block.

8. The computer-implemented method of claim 7, wherein the second processors are part of a graphical processing unit (GPU).

9. The computer-implemented method of claim 1, wherein the scanning antenna range is 360 degrees.

10. The computer-implemented method of claim 1, wherein said outputting the radar image comprises displaying the radar image on a display unit.

11. A system for simulating an image of a terrain scanned by a simulated radar beam generated by a simulated radar antenna, comprising:
    a first calculation unit comprising a first processor for calculating a power reflected by the terrain while an orientation of the simulated radar antenna is varied within a scanning antenna range;
    a second calculation unit comprising a plurality of second processors for calculating a convolution power for the terrain while the orientation of the simulated radar antenna is varied within the scanning antenna range, said calculating on a first processor and said calculating on a plurality of second processors being performed concurrently and in parallel;
    an image generating unit for combining the power reflected by the terrain and the convolution power to obtain combined data, generating a radar image using the combined data and outputting the radar image.

12. The system of claim 11, wherein the second calculation unit is further configured for dividing the terrain into a plurality of range bins and assigning each range bin to a respective one of the plurality of second processors.

13. The system of claim 12, wherein a number of the range bins is greater than a number of the second processors and the second processors are configured for concurrently calculating in parallel the convolution power for the respective ones of the plurality of range bins associated thereto.

14. The system of claim 12, wherein a number of the range bins is equal to a number of the second processors and the second processors are configured for concurrently calculating in parallel the convolution power for a respective one of the plurality of range bins associated thereto.

15. The system of claim 14, wherein the second calculation unit comprises a multi-core central processing unit (CPU).

16. The system of claim 12, wherein a number of the range bins is less than a number of the second processors.

17. The system of claim 16, wherein the second calculation unit is further configured for dividing each range bin into a plurality of thread blocks and assigning a respective one of the second processors to each thread block, and the second processors are configured for concurrently calculating in parallel the convolution power for the respective thread block.

18. The system of claim 17, wherein the second calculation unit comprises a graphical processing unit (GPU).

19. The system of claim 11, wherein the scanning antenna range is 360 degrees.

20. The system of claim 11, wherein said outputting the radar image comprises displaying the radar image on a display unit.

* * * * *